United States Patent [19]
Gross

[11] 3,840,166
[45] Oct. 8, 1974

[54] SHAFT SEAL
[75] Inventor: Dario R. Gross, Owosso, Mich.
[73] Assignee: Midland-Ross Corporation, Cleveland, Ohio
[22] Filed: Oct. 2, 1972
[21] Appl. No.: 293,849

[52] U.S. Cl.............. 277/74, 277/76, 277/DIG. 8, 277/95
[51] Int. Cl............................................ F16j 15/16
[58] Field of Search...... 277/70, 75, 76, 74, DIG. 8, 277/95; 285/281, 278, 98

[56] References Cited
UNITED STATES PATENTS
2,793,058  5/1957  Jacobson .................. 285/278 X
3,272,572  9/1966  Lloyd ........................ 277/74
3,405,959  10/1968  Walker ..................... 277/74 X Primary Examiner—Samuel B. Rothberg
Attorney, Agent, or Firm—Irvin L. Groh

[57] ABSTRACT

A sealing means for the end of a rotating crankshaft by which lubricating fluid under pressure may be transmitted from a source in a stationary housing to a passage in a relatively rotating crankshaft. The seal relies on differential pressure of the lubricating fluid and the relatively lower pressure existing in the crankcase and surrounding the crankshaft to urge the seal means axially into sealing engagement with the rotating crankshaft.

6 Claims, 2 Drawing Figures

SHAFT SEAL

SUMMARY OF THE INVENTION

This invention relates to a sealing means between relatively rotatable members and more particularly, to a pressure seal between relatively rotating parts by which fluid under pressure may be conveyed from one part to another.

Reciprocating air compressors of the type commonly used to supply air for air brake systems on commercial vehicles such as trucks and buses, not only are driven by the engine of the vehicle but commonly are pressure lubricated by the same lubricating source or pump which lubricates the vehicle engine. In such arrangements, lubricant is delivered to passages in the rotating crankshaft of the compressor for distribution to connecting rod bearings and the like. Since the crankshaft is rotating in a crankcase at substantially atmospheric pressure and since lubricant is delivered under a relatively high pressure of up to as much as 80 psi, it becomes important to insure that the lubricant is delivered to the rotating crankshaft without leakage which can cause a pressure loss impairing proper lubrication of the compressor or, even more critically, the engine itself.

It has been the practice to rely on closely fitted bearings or seals which usually act radially of the relatively rotating parts, namely, the crankshaft and the crankcase. However, such seals for the most part are either too complicated and costly or ineffective to prevent leakage and a drop in the pressure of the lubricant fluid. Moreover, such seals and bearings often require exact axial alignment between the crankshaft and the crankcase to achieve a proper sealing function and such exact axial alignment often is difficult to achieve in manufacture of compressors due to normal manufacturing variations in dimensions of the relatively rotating parts or due to thermal expansion or contraction of the parts during operation of a given compressor.

It is an object of the invention to provide a sealing means which relies on the difference in pressure between the fluid being delivered for lubrication from the stationary to the rotating part and the lower pressure surrounding the parts to maintain the sealing means in its proper sealing relationship.

It is another object of the invention to provide a sealing means which accommodates variations in dimensions between relatively rotating parts and which acts identically to seal the lubricant over a relatively wide range of both operating and manufacturing variations in the dimensions and position of the parts.

Still another object of the invention is to provide a sealing means in which the sealing element may rotate relative to either the rotatable or the stationary part to afford alternate wear surfaces extending the life of the seal.

In accordance with the present invention, a single sealing element is disposed between relatively rotating parts and is acted upon by the pressure of the lubricant which is delivered from the non-rotating part to a rotating part such as the crankshaft to insure that the sealing surface between the relatively rotating parts is maintained and, moreover, is maintained in direct relationship to the magnitude of the pressure being delivered. Moreover, the seal is so disposed that it accommodates axial variations in dimension between the relatively rotating parts and also is free to rotate relative to or with the rotatable part to minimize wear on the sealing element.

DETAILED DESCRIPTION

Figure 1:
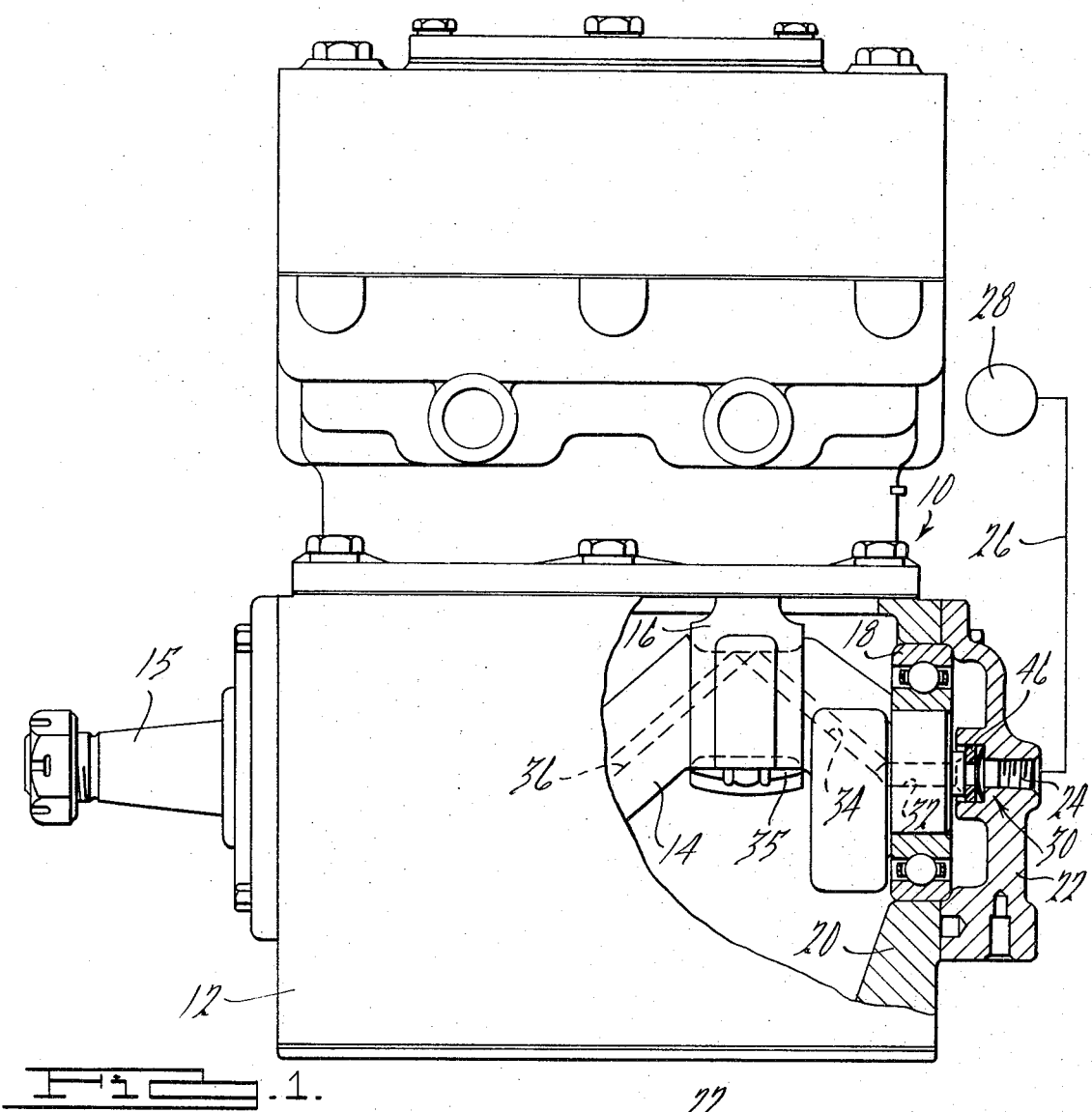
FIG. 1 is a side elevation of a reciprocating compressor embodying the invention with portions broken away and shown in cross-section.

The invention is shown embodied in a reciprocating compressor 10 having a crankshaft housing 12 in which a crankshaft 14 is horizontally disposed for rotation. The crankshaft 14 is rotated by a conventional drive mechanism which may include a pulley, not shown but mounted on the end 15 of the crankshaft 14. The power source for rotating the crankshaft may be a vehicle engine which also is not shown. The rotating crankshaft 14 transmits motion to a connecting rod 16 which is conventionally arranged to reciprocate a piston which also is not shown. One end of the crankshaft 14 is journaled in a ball bearing assembly 18 which is supported in a wall 20 of the crankcase housing 12. The bearing assembly 18 is held in position by a cover plate 22 which is bolted to the wall 20 of the case 12 and is provided with a port 24 which receives lubricating fluid through a line 26 from a source generally designated at 28. The source 28 may be a lubricating pump associated with a vehicle engine which is customarily used to drive the compressor 10. The lubricating fluid is delivered under pressure from the port 24 through a seal structure designated at 30 to an axial passage 32 in the end of the crankshaft 14 which communicates with an angular drilled passageway 34 to deliver the lubricating fluid to the bearing 35 between the connecting rod 16 and the crankshaft 14. Another drilled passageway 36 communicates the lubricating fluid at the connecting rod bearing 35 with a second connecting rod bearing which is not shown in the drawings.

Figure 2:
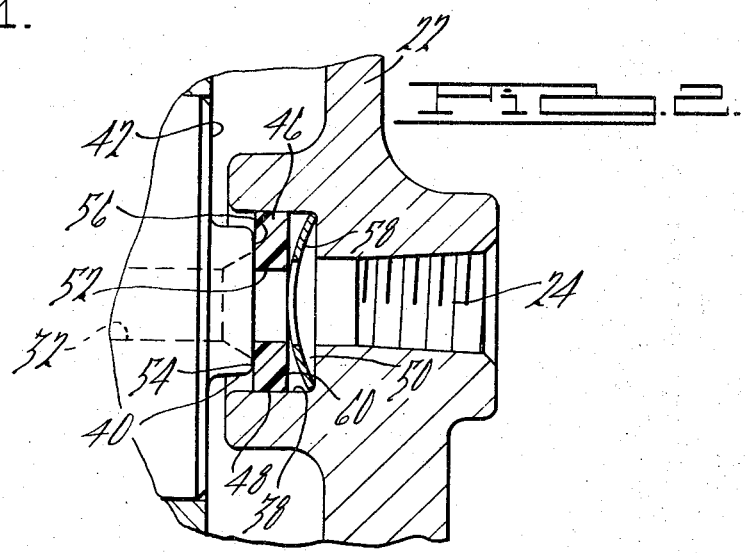
FIG. 2 is a cross-sectional view at an enlarged scale of a portion of the structure shown in FIG. 1.

The seal structure 30 by which the fluid pressure of the lubricating fluid is maintained between the relatively stationary housing and a rotating crankshaft 14 is best seen in FIG. 2. The end cap or cover plate 22 is provided with an enlarged axial bore portion 38 which communicates with the port 24 and receives the lubricant under pressure. The open end of the bore portion 38 receives an annular lip 40 formed integrally on an end face 42 of the crankshaft 14. The annular lip 40 is substantially smaller in diameter than the bore 38 so that the lip 40 is widely spaced radially from the wall of the bore 38.

The sealing structure includes a sealing element 46 in the form of a flat, annular ring which is preferably made of a strong synthetic material such as nylon, for example. The seal element 46 is disposed in the bore portion 38 with its outer circumferenetial surface 48 in sliding engagement with the cylindrical walls of the bore portion 38. The seal element 46 acts to provide a fluid receiving chamber 50 in the bore portion 38 at one side of the sealing element 46 which is in communication with the port 24. The seal element is provided with a central aperture which is smaller than the annular lip 40 and which is in axial alignment with the port 24 and the axial passage 32 in the crankshaft 14. The seal element 46 is urged to the left, as viewed in the drawings, so that a sealing face 54 formed at one side thereof engages the end sealing surface 56 formed on the lip 40 by means of a bowed spring washer 58. The spring washer 58 acts between a surface 60 on the seal element 46 oppositely facing from the sealing face 54 and the end of the bore 38 to exert a slight force to insure that the seal element 46 is in initial engagement with the end of the crankshaft when pressure in the chamber 50 is relatively low such as when the lubricating pump or source 28 begins delivery of lubricant to the compressor 10.

During operation of the compressor 10 with the pump or source 28 delivering lubricant thereto, pressure will be transmitted through the line 26 to the port 24 and into the chamber 50 in the bore portion 38.

From the chamber 50, the lubricant communicates through the aperture 52 in the seal element 46 directly to the axial passage 32 in the crankshaft 14. The pressure of the lubricant which often may be as high as 80 psi acts on the seal element 46 over an effective area which is equal to the annular area defined by the diameter of the bore 38 less the area defined by the area circumscribed by the contact of the sealing surface 56 on the lip 40 with the sealing face 54 of the seal element 46. This area is affected by the pressure in the chamber 50 to urge the seal element 46 to the left as viewed in the drawings, in opposition to the relatively lower force acting to the right due to the pressure in the crankcase which, for all practical purposes, may be considered as being equal to atmospheric pressure. The magnitude of the force urging the sealing element into contact with the crankshaft is in direct proportion to the pressure of the lubricant so that the sealing surfaces 54 and 56 are pressed together more firmly at higher lubricating pressures than at lower pressures.

The axial dimension of the crankshaft may vary during thermal expansion and contraction of the relatively rotating parts so that the end face 42 of the crankshaft varies in its spacing from the end plate 22. The crankshaft also may vary in dimension due to manufacturing variations. In either instance, the sealing element 46 will maintain the same sealing relationship relative to the crankcase housing and to the crankshaft.

During operation of the compressor 10 and delivery thereto, it will be noted that the sealing element 46 may be moved axially in the bore 38 and accommodates relative rotation between the annular lip 40 and the sealing element 46. If, however, there is a momentary friction between the contacting surface 56 of the lip 40 and the surface 54 of the seal element 46 due to excessive pressure build up, for example, the sealing element 46 is free to rotate with the crankshaft 14 and relative to the bore 38 and at the same time maintains a sealing engagement between the circumferential surface 48 and the wall of the bore 38. This arrangement which affords relative rotation between the seal 46 and the crankshaft 14 or between the seal and the housing insures relatively long life of the sealing element 46.

It will now be seen that there has been provided a sealing means which relies on differential pressure of the sealing lubricant and the area surrounding the relatively rotating parts so that lubricant may be transmitted without a drop in pressure to insure proper lubrication of the various parts of the compressor 10. Also, the sealing arrangement accommodates not only axial variations between the rotating crankshaft and its nonrotatable housing, but also affords relative rotation between either the sealing element and the crankshaft or between the sealing element and the housing or a combination of both.

What is claimed is:

1. A sealing means between relatively rotating members comprising; a housing forming one of said members and having an open ended bore portion, a rotatable shaft forming the other of said members and having a free end disposed within said bore in axially spaced relationship to the end of said bore portion and in radially spaced relationship to the walls of said bore portion, an axial passage in said shaft extending through the end thereof, an annular lip on said end of said shaft surrounding the open end of said passage, and a single sealing element slidably mounted in said bore portion and forming a fluid receiving chamber in said bore portion and at one side of said sealing element, said sealing element forming a sealing face at the other side thereof and being engageable in sealing relationship with said annular lip, said sealing element having a fluid passage disposed axially of said bore and said annular lip and communicating with said chamber and with said axial passage in said shaft, said bore portion being of larger cross-sectional area than the area encompassed by engagement of said sealing face with said annular lip whereby said sealing element presents a pressure responsive surface in said chamber responsive to fluid under pressure in said chamber to urge said sealing face into engagement with said annular lip with a force proportional to the pressure of the fluid.

2. The sealing means set forth in claim 1 in which said sealing element forms a circumferential surface engageable with the walls of said bore portion for relative axial and rotational movement in said bore portion.

3. The sealing means set forth in claim 1 and further comprising biasing means in said bore portion and operative to urge said sealing element into engagement with said annular lip.

4. Sealing means set forth in claim 1 in which said fluid passage in said sealing element has a cross-sectional area smaller than the cross-sectional area encompassed by said annular lip.

5. A sealing device for transferring fluid under pressure from a stationary portion of a housing to an axial passage in a rotating shaft comprising, a single disc-shaped sealing element having a passageway therethrough disposed in axial alignment with said passage in said rotating shaft and having a circumferential surface in slidable engagement with a bore portion of said housing, said sealing element being rotatable relative to said bore portion and said shaft, said single sealing element having a face at one side thereof in engagement with the free end of said rotating shaft and forming a fluid receiving chamber in said bore portion at the other side thereof, said bore portion in said chamber having a cross-sectional area greater than the cross-sectional area embraced by said sealing face in engagement with said rotating shaft, said sealing element forming an annular pressure responsive surface in said chamber extending radially inward from said circumferential surface whereby fluid under pressure in said chamber acts on said pressure responsive surface of said single sealing element to urge the latter into engagement with said rotating shaft with a force proportional to the pressure of the fluid.

6. The sealing means set forth in claim 5 and further comprising resilient means disposed in said bore portion and operative to bias said sealing element into initial engagement with said rotating shaft.

* * * * *